United States Patent [19]

Carmichael

[11] Patent Number: 5,299,382
[45] Date of Patent: Apr. 5, 1994

[54] SUPPORT FRAME FOR WREATHS

[76] Inventor: Thomas Carmichael, P.O. Box 195, Tracyton, Wash. 98393

[21] Appl. No.: 658,325

[22] Filed: Feb. 20, 1991

[51] Int. Cl.$^5$ .............................................. A01G 5/00
[52] U.S. Cl. ................................... 47/41.01; 248/27.8
[58] Field of Search ................ 47/47, 41.01; 248/27.8

[56] References Cited

U.S. PATENT DOCUMENTS

| | | | |
|---|---|---|---|
| 1,611,589 | 12/1926 | Janusek | 47/41.01 |
| 1,616,894 | 2/1927 | Finlayson | 47/41.11 |
| 1,693,372 | 11/1928 | Denman | 47/41.13 |
| 2,258,442 | 10/1941 | Brenner . | |
| 2,288,732 | 7/1942 | Nickerson | 47/41.01 |
| 2,740,218 | 4/1956 | Miller | 47/41.01 |
| 2,761,233 | 9/1956 | Brown | 47/41.1 |
| 3,303,610 | 2/1967 | Erbguth | 47/41.11 |

FOREIGN PATENT DOCUMENTS 22868 of 1929 Australia .

OTHER PUBLICATIONS

"Wreath and Wire Frames", North Wreath Supply Brochure-2 pages.
Related U.S. Application Ser. No. 07/611,094.
Photographs Showing various supporting frames for wreaths on the market.

Primary Examiner—Stephen J. Novosad
Assistant Examiner—Joanne C. Downs
Attorney, Agent, or Firm—Pollock, Vande Sande & Priddy

[57] ABSTRACT

A supporting frame for supporting decorative materials to be formed into a wreath or the like, comprises a frame member, preferably ring-shaped, having a first substantially horizontal portion which is provided with means for retention of the decorative material and prevention of its movement in the plane of the ring-shaped member after the material has been fastened thereto. A second vertical portion of the ring member forms a lip extending along the outer periphery of the first horizontal portion and is designed to increase the strength of the frame and prevent the decorative materials from rolling off the face of the ring-shaped member.

11 Claims, 1 Drawing Sheet

U.S. Patent     Apr. 5, 1994     5,299,382
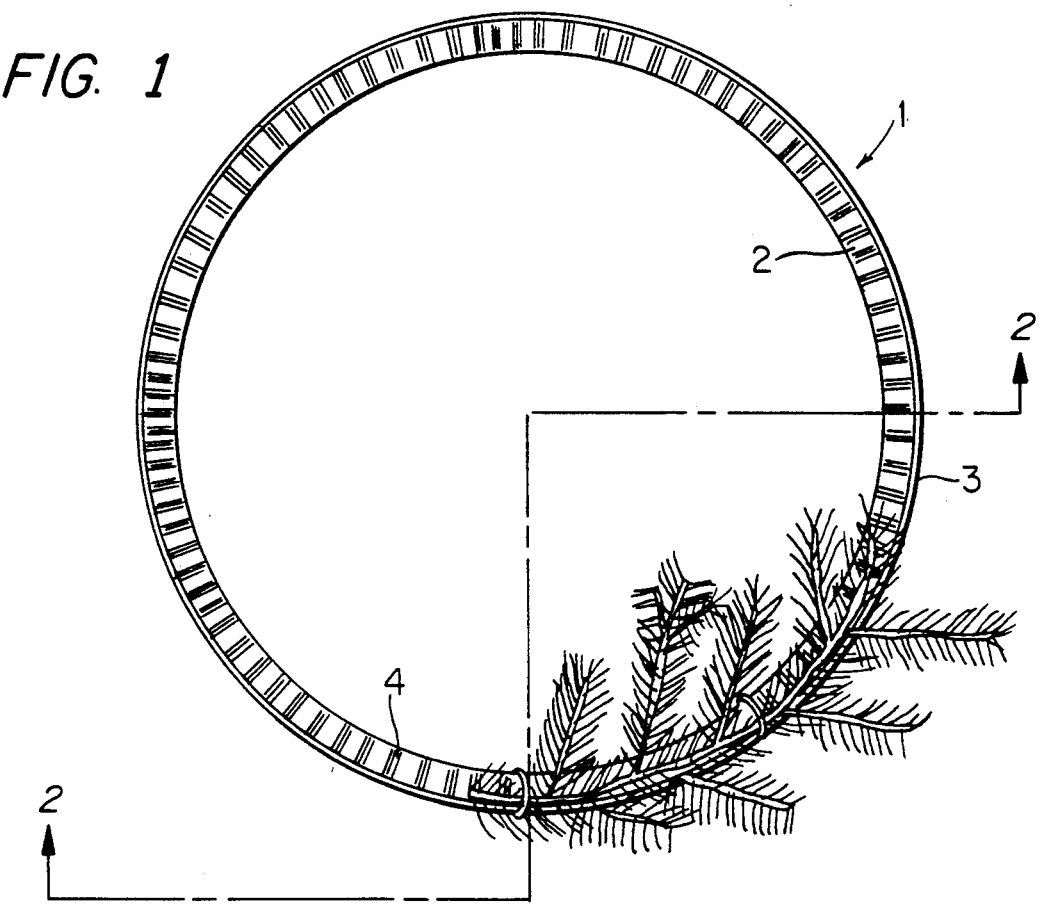
FIG. 1
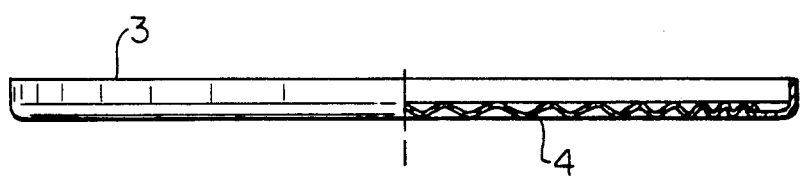
FIG. 2
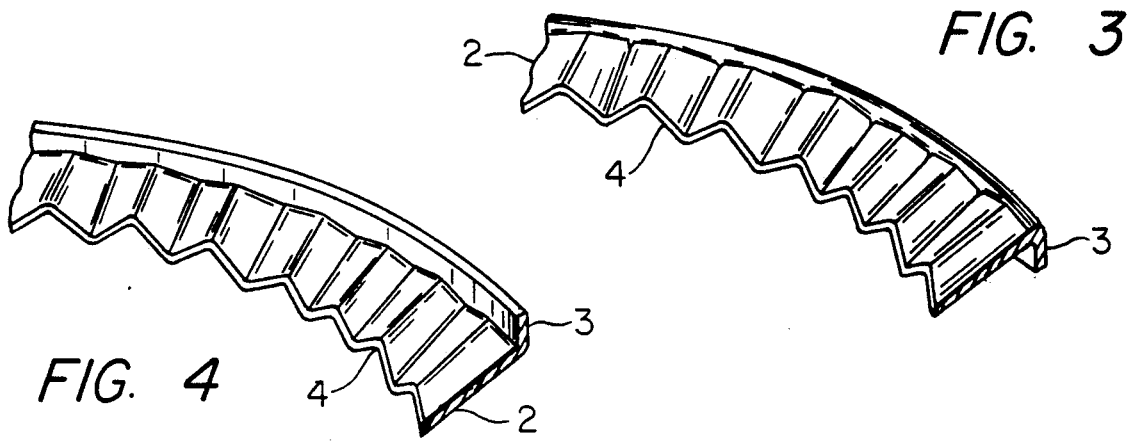
FIG. 3
FIG. 4

SUPPORT FRAME FOR WREATHS

BACKGROUND OF THE INVENTION

The present invention relates to the manufacture of wreaths, such as evergreen Christmas wreaths or desert wildflower wreaths, and specifically to supporting frames for mounting thereon decorative materials from which wreaths, and the like, are made.

In manufacturing wreaths, various wire frames have commonly been used to provide support for boughs which are assembled to form a wreath.

One typical example of a supporting frame for wreaths known on the market is a single wire ring with a plurality of U-shaped crossbars spot-welded to the ring, and equally spaced along its circumference. The greens are arranged into the U-shaped crossbars and then the legs of the U are brought together to secure the greens to the ring. Since the crossbars are uniformly spaced, this requires much labor to trim the twigs of the greens to the proper uniform length. When the U-shaped crossbar is squeezed together, the bunch on the wire becomes narrow and tall which results in an unattractive looking wreath. Also, as the U-shaped crossbars are squeezed together, the points protrude through the opposite side, further distracting from the appearance of the wreath and presenting a safety hazard. Furthermore, the manufacturing cost of the ring is relatively expensive.

Some other frame structures including, for example, single wire zigzags with no crossbars are also available on the market. These are relatively inexpensive, but the greens tend to roll off the face of the ring so the wreath does not retain its shape and the appearance of the wreath becomes deteriorated.

Other types of known supporting frames include double-wire rings with crossbars which serve to space the rings apart. Such structure of the supporting frame allows to form thereon a more attractive looking, flat and full wreath. The greens do not tend to roll off the face of the ring. However, the labor involved in securing the greens on such a frame is relatively high because they tend to slip around the ring in the process of assembly. Also, the cost of manufacturing the double wire ring is relatively high.

SUMMARY OF THE INVENTION

It is an object of the present invention to provide a supporting frame for wreaths which would allow for the manufacture of a wreath that maintains the most attractive appearance.

It is another object of the present invention to provide a frame structure which would firmly and rigidly support the wreath material secured thereto.

It is still another object of the invention to provide a frame structure suitable for forming thereon a stable, wide, fully-shaped and therefore aesthetically appealing wreath.

It is another object of the invention to provide a frame which is simple and inexpensive to manufacture and on which the greens can be easily assembled and therefore, the resulting wreath would be inexpensive to manufacture.

Another object of the invention is to provide means on the supporting frame which would prevent the greens used in making the wreath when secured on the frame from slipping from their position on the frame, either in the plane of or about the frame.

A still further object of the invention is to provide a frame for use in making wreaths which will remain rigid and maintain its shape after attachment thereto of the material used to make up the wreath, such that it can be easily handled.

To this end, the supporting frame of the present invention comprises a frame member having a first substantially horizontal portion and a second substantially vertical portion. Means are provided on the first horizontal portion for retention of the green material or other decorative material and prevention of its movement in the plane of the frame member after the decorative material has been fastened thereto. The second vertical portion of the ring-shaped member forms a lip extending along the outer periphery of the first horizontal portion and is designed to increase the strength of the frame and to prevent the boughs from "rolling" off the face of the frame member.

In one preferred embodiment, means for preventing movement of the greens or other decorative material in the plane of the frame member include corrugations provided in the horizontal portion along the inner periphery thereof. Other means can be provided, for example, cirations along the inner periphery of the horizontal portion. The frame member is preferably a circular ring-shaped member.

Other advantages achievable by the present invention will become apparent from the following description of one preferred embodiment of the present invention with reference being made to the accompanying drawings, wherein:

BRIEF DESCRIPTION OF THE DRAWINGS

FIG. 1 shows a top plan view of the supporting frame of the present invention with a bough secured to the frame;

FIG. 2 shows a side elevational view partially in section;

FIG. 3 shows a partial bottom perspective view of the present invention frame; and FIG. 4 shows a partial top perspective view thereof.

DESCRIPTION OF THE PREFERRED EMBODIMENT(S)

As shown in FIGS. 1–4, the present invention supporting frame for a wreath includes a ring member 1 which has a substantially L-shaped structure. The L-shaped structure comprises a first portion 2 which is horizontal in the plane of the ring member and a second portion 3 which is substantially vertical with respect to the plane of the ring member and extends along the outer periphery of the ring member around its circumference. The second portion 3 forms an upwardly extending lip (or rim).

The horizontal portion 2 has a plurality of corrugations 4 which are formed along its inner periphery.

The corrugations 4 on the horizontal portion 2 constitute means for preventing boughs from moving along the ring member. However, other means can be provided instead of the corrugation such as, for example, cirations. The horizontal portion 2 of the ring frame is relatively wide and rigid such that the green material supported on the frame can be easily formed into a full, wide and stable wreath. The width of the horizontal portion 2 and the provision of the lip along the outer circumference are designed for preventing the wreath material from rolling around the ring member in a direction radial to the ring plane. The provision of the lip portion also increases the strength and rigidity of the supporting frame.

These features are very important and advantageous since the wreath can be easily handled maintaining a proper, stable shape and attractive appearance.

In the preferred embodiment, the ring member is made of flat iron strapping. However, other materials such as, for example, aluminum, steel bands, some types of plastics, for example flat, thin plastic, or other metal strapping can be used for manufacturing a ring member. For a 12" diameter ring, the horizontal portion of the ring is preferably about ½" wide. The height of the lip is preferably about ⅛ and which makes the ratio between the horizontal and lip portion 4:1. However, the ratio between the horizontal portion and the lip portion may be about 1:3 to 1:5.

The corrugations provided along the inner edge of the horizontal portion can have a dimension of, for example, about ⅜" from crest to crest and a depth at the inner edge of the horizontal portion of about ⅛". In this one preferred embodiment, the diameter of the ring member is about 12", which would support a wreath of about 22-24" in diameter. It is not uncommon in the industry to use rings up to a diameter of 48" or 56". The width, height and corrugations would all be adjusted proportionally.

The present inventive frame can be simply manufactured as follows. A flat metal piece such as iron strapping, for example ⅝" wide, is passed through a set of rolls which bend the metal piece into an L-shaped member having a wider horizontal portion of about ½" and a vertical lip portion of about ⅛". Next, the inner horizontal portion is corrugated. This can be accomplished by passing the horizontal portion through a pair of mating gears set at an angle to each other such that they do not crimp the metal strip next to the lip but make a deep crimp along the edge opposite to the lip which causes the L-shaped band to be formed into a circular member. The overlapping ends are then welded together completing a ring. The above structure of a single piece frame is simple and inexpensive to manufacture. Various other methods may be used to manufacture the present invention supporting frame.

The present inventive ring member is constructed of a metal which is thick enough to provide rigidity to the frame so that it will retain its shape after attachment of the decorative material used to make the wreath.

In the preferred embodiment of the invention, the material used to make up the wreath, such as evergreen boughs, will be placed into the cavity of the L-shape. Small clinches of wire can then be tied around both boughs and the ring member at a plurality of desired locations along the circumference of the ring member to securely attach the boughs to the frame. This operation of securing boughs on the frame can be done manually or by a suitable wire loop making machine.

While a preferred embodiment of the present invention has been illustrated and described, it will be appreciated that various changes can be made therein without departing from the spirit and scope of the present invention.

I claim:

1. A unitary, ring-like member forming a frame for use in the fabrication of a wreath defined by material such as boughs and greens or the like;

said unitary member defining an inner and outer periphery and having a first substantially planar portion whose maximum dimension parallel to the plane of said member is substantially greater than its maximum dimension transverse to the plane of said member, said substantially planar portion including a plurality of circumferentially spaced means for impeding movement of said wreath material in the plane of said frame after being secured thereon;

said member also having at least one second upstanding portion which is integral with one of the inner and the outer periphery of said first portion and extends transversely to the plane of said first portion, said upstanding portion having a sufficient height transversely to the plane of said member to thereby resist deformation of said unitary member transversely to said plane of said member and to prevent the wreath material from rolling off the face of said member.

2. A frame according to claim 1, wherein said unitary planar member has a generally L-shaped cross-section along the length thereof.

3. A frame according to claim 1, wherein said circumferentially spaced means include corrugations integrally formed in said first planar portion.

4. A frame according to claim 3, wherein said corrugations are vertical with respect to the plane of said frame.

5. A frame according to claim 1, wherein said member is made of a flat, thin strip of metal.

6. A frame according to claim 1, wherein the ratio between the width of said first, planar portion and the height of said second upstanding portion is in the range of about 3:1 to 5:1.

7. A frame according to claim 1, wherein said member is a closed circular member.

8. A frame according to claim 1, wherein said member is made of a flat, thin piece of plastic.

9. A frame according to claim 1, wherein said ring-shaped member is made of metal strapping.

10. A frame according to claim 6, wherein said ratio is 4:1.

11. A frame according to claim 7, wherein said frame member has a diameter of about 12", and wherein said first horizontal frame portion is about ½" wide and said second vertical portion is about ⅛" high.

* * * * *